C. W. Hubbard,
Grinding and Polishing Saws.
N° 27,221. Patented Feb. 21, 1860.

UNITED STATES PATENT OFFICE.

CHARLES W. HUBBARD, OF PITTSBURG, PENNSYLVANIA.

MACHINE FOR GRINDING AND POLISHING SAWS.

Specification of Letters Patent No. 27,221, dated February 21, 1860.

*To all whom it may concern:*

Be it known that I, CHARLES W. HUBBARD, of the city of Pittsburg, in the county of Allegheny and State of Pennsylvania, have invented a new and useful Improvement in Machines for Grinding and Polishing Circular Saws; and I do hereby declare the following to be a full, clear, and exact description thereof, reference being had to the annexed drawing, forming part of this specification, in which—

Figure 3:
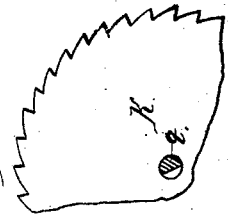
Figure 1:
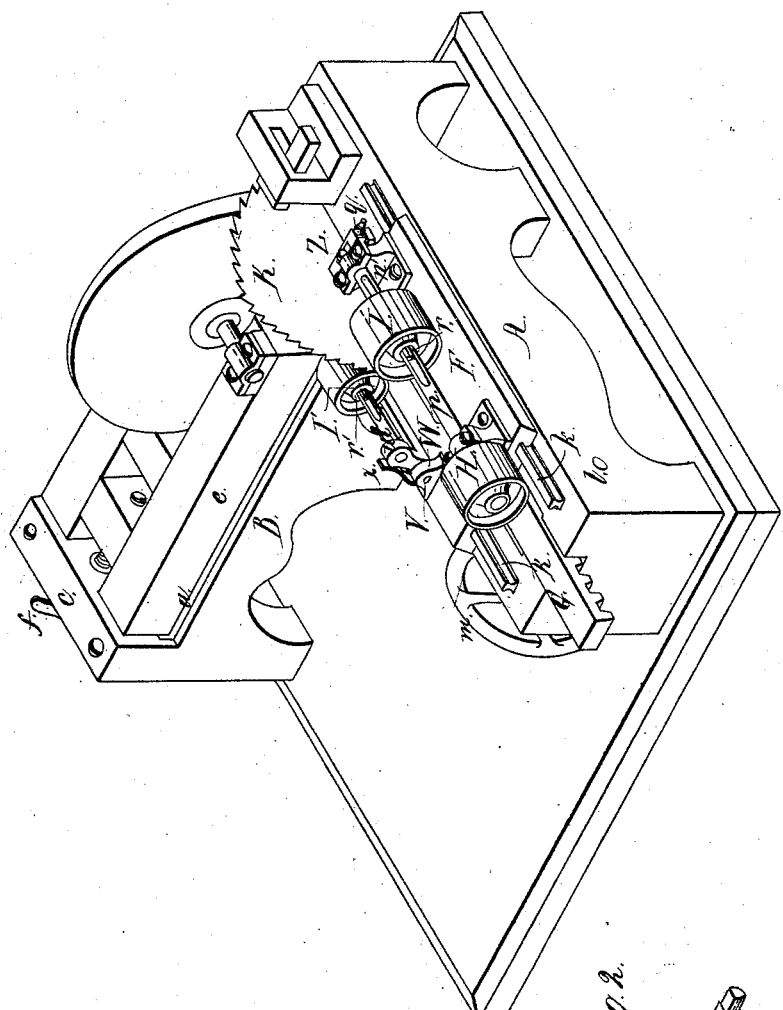
Figure 2:

Figure 1, represents a perspective view of my improved machine. Fig. 2, is a perspective representation of the mandrel used to hold the saws, when being ground, and Fig. 3, is a view of part of the circular saw, showing the portion of the eye, occupied by the semi-cylindrical mandrel.

My invention consists in certain improvements in machines used for grinding and polishing the sides of circular saws.

These improvements are designed to adapt the machine to the grinding of circular saws of various sizes, from the largest to the smallest in diameter, and of varying thickness and to give steadiness and uniformity to the pressure of the grindstone on the face of the saw.

To enable others skilled in the art, to construct and use my improved machine, I will proceed to describe its construction and operation.

The frame work of my machine (see the drawing) consists of two parts, one A, which carries the saw K, and the apparatus for holding and rotating it; and the other, B, which carries the grindstone. The frame B is set at right angles to the frame A, at the end of the frame A, near which the saw is placed to be ground.

I will first describe the construction and arrangement of the frame B.

On the top of the frame B, is a horizontal carriage C which is set on parallel ways $a\ a$, projecting from the top of the side pieces of the frame B. This carriage C is not quite so long as the frame B, so as to allow it a play of a few inches more or less, for the purpose of withdrawing the grindstone from the face of the saw, and adjusting it to the thickness of the saw to be ground. At the end of the frame B, is a screw $b$, which projects horizontally from the block $c$, at the end of the frame B, midway from either side of the frame B. The part of the screw $b$ which passes through the block $c$, is smooth, and a collar $d$ on the screw close to the inner face of the block $c$ prevents the retraction of the screw through the block $c$. The projecting part of the screw $b$, has screw threads cut on it, which work in a female screw, in the cross piece $e$ in the sliding carriage $c$; so that by turning the screw $b$ by its handle $f$ the sliding carriage is slid forward or backward on the ways $a\ a$ on the frame B. On the front end of the carriage C, is placed the circular grind stone D which revolves on its axis or journals $g$ in journal boxes $h$, on the carriage C. The revolution of the grind stone, is effected by the means of a belt from the engine, passed over a pulley E on the axle of the grind stone.

I now proceed to describe the frame A and its appurtenances. It is placed, as before stated, at right angles to the frame B, at the end nearest the grind stone (which I shall call the front end). On the side of the frame farthest from the grind stone is placed the rest block $g$, in front of the grind stone. Through a slot in this rest block $g$, is passed the rest $h$, which is placed horizontally with its broad flat head $h'$, projecting toward the grindstone. The width of this head $h'$ is the same, or a little greater than the thickness of the grindstone, and it may be pressed forward so as to come in contact with the edge of the grind stone. A key or wedge $i$, passed through the slot in the rest block $g$, serves to fasten the rest $h$ in any position farther from, or nearer to, the grind stone, at which it may be desired to be placed, so as to accommodate any thickness of saw, which may be placed in the machine.

On the frame A in the rear of the rest block $g$, is a sliding table F of the width of the frame A. This sliding table is horizontal, and slides on parallel ways $k\ k$, placed on the top of the frame A. Attached to the under side of this sliding table F is a ratchet bar G with teeth projecting downward, throughout its entire length, which gear into the teeth of the cog wheel (not seen in the drawing) but which is placed under the sliding table F, in the frame A, and is attached to, and turns with the horizontal axle $l$, at one end of which, is the hand wheel $m$, by which it is turned. The ratchet bar G works in a groove made for it in the top of the frame A through which it gains access to the cog wheel, before mentioned. By means of this ratchet bar and cog wheel, operated by the hand wheel $m$, the sliding table F, is pushed forward toward the front end of the frame A, or withdrawn at pleasure. On the outer side of the sliding table F, and at either end is placed a pillar block n n' which support the journal boxes of the pulley shaft p. This shaft p is revolved on its axis by a belt passed over the pulley H, and operated from the engine. On the shaft p between the pillar blocks n n', is a friction roller I, which is attached to the shaft by a small key r, so that it revolves with the shaft, but the key r being removed, the friction roller may be moved to any desired position on the shaft p between the pillar blocks n n', and fastened by the key r. On the inside edge of the sliding table F, is a horizontal shaft t, the journals of which, are placed in a swinging frame u which is pivoted at v to the blocks w w, (one of which is concealed by the saw K in the drawing).

The blocks w w, to which the swinging frame u is pivoted, are attached to the sliding table F. A spring, consisting of a leaf or plate of steel x is attached at one end to the sliding frame F, and the free end presses against the swinging frame u at a point above the journals of the shaft t, and as far as possible above the pivot v of the swinging frame. One such spring as x, is placed at each end of the swinging frame u. The shaft t, carries a friction roller I', similar to the friction roller I, on the shaft p, which revolves with its shaft, the friction roller I' being keyed to its shaft t, by a key r, in like manner as the friction roller I to its shaft p; so that it may be adjusted at any desired position on the shaft. The friction roller I' being placed opposite to the friction roller I, is pressed forcibly against it, by the action of the springs x x against the swinging frame u. At the end of the pillar block n', and supported by it, is the mandrel q, on which the saw K is placed. This mandrel is placed horizontally, and is of such a length, that the point on which the eye of the saw is to rest, is in the same horizontal plane, as the center of the friction roller shafts p and t, and in the same vertical plane, as the point of contact of the two friction rollers I and I'. The distance of the friction rollers I and I' from the mandrel, is so regulated by shifting the rollers, that when the saw is on the mandrel the friction rollers press against opposite sides of the saw, holding the saw between them firmly and steadily, and causing it to revolve as they revolve. The mandrel is peculiarly constructed (as will be seen in Fig. 2,) so as to permit the grindstone to come so close to the center of the saw, as to grind it to its eye. Each end of the mandrel is semicylindrical, instead of perfectly round, so that when the mandrel is placed in the eye of the saw it exactly fits one half only of the eye, (see Fig. 3) leaving a portion of the eye at the inner edge of the mandrel unoccupied by it, and thus permitting the grindstone to pass clear to the edge of the eye, before it comes in contact, with the mandrel. Thus the mandrel furnishes a semicylindrical axis or journal, on which the saw revolves, as easily and truly, as it would, were the mandrel perfectly cylindrical. The mandrel, at each end, is of different diameters, forming steps, (as seen in Fig. 2,) so as to afford varying thicknesses of mandrel to accommodate the size of the eye of the saw, which varies with different diameters of saws. If preferred, the ends of the mandrel may be made tapering, to accomplish the same object. This mandrel is attached to the pillar block n' by a screw z passing through a slot o in the mandrel, midway from either extremity. This enables the mandrel to be reversed, so as to use either end, and the slot is necessary to adjust the mandrel, so that that portion on which the saw rests, may be in the exact vertical plane of the point of contact of the two friction rollers I and I'. The side of the mandrel, which is flat, at one end, is semicylindrical at the other end, so as to allow that portion of the eye of the saw, which is not occupied by the mandrel, to be nearest to the grindstone, whichever end of the mandrel is in use.

Having thus described the construction of my improved machine, it is necessary to explain more fully its operation.

The circular saw K, being placed on that part of the mandrel q, which fits the eye of the saw, and the mandrel being so adjusted by the set screw z, that the saw is in the vertical plane of the point of contact of the rollers I I', parallel to the shafts p and t, at right angles to the grind stone, and the rollers I and I' being so adjusted as to grip the saw between them, at or near its edge, the rest n is adjusted by the key i, so that its flat head h' presses against the face of the saw, without distorting it from its vertical position. The sliding table F is moved by the hand wheel m until the edge of the saw is in line with the face of the grind stone, and then the parts are all adjusted for commencing grinding. The grindstone is then screwed up by the screw b until its face touches the face of the saw and the machine is set in motion. The grind stone is made to revolve rapidly on its axis at about two hundred revolutions per minute, and the friction roller I is made by the pulley H to revolve, so as to cause the saw K and the friction roller I' to revolve slowly: the saw revolving in the same direction as the grind stone, but much less rapidly. As the saw is being ground on that face, which is next the grindstone, the hand wheel m is slowly turned, so as to move the sliding table F forward, causing the saw to pass between the grindstone D and the head h' of the rest, until the mandrel reaches the grindstone, when the whole face of the saw will be ground. The rest $h$, supporting the saw opposite the grindstone, causes it to be ground smoothly and evenly, as it sustains the pressure of the stone, and the uniform rotation of the friction rollers, prevents the saw being ground unevenly.

In case it is desired to grind a saw, which is thicker at the edge than the center, it is done by pressing forward the grindstone very slowly and slightly, as the saw passes between the grindstone and the head of the rest.

In grinding saws, it is manifestly necessary, that the saw as well as the grindstone should revolve, for if the saw remained stationary, it would only be ground in one spot where it touched the stone: and also that the saw should not revolve with, or as fast as the stone, for then the saw would not be ground at all, as a rolling contact would be all the result. It is therefore necessary, that the motion of the saw should be slower than that of the stone, and also, that the motion of the saw should be regular and uniform, otherwise the grindstone will grind one spot more than another, producing an uneven surface on the face of the saw. To effect this result, is the design of my improvement, which I find in practice to operate quite successfully. Those machines in which the motion of the saw is in any way dependent upon the motion of the grindstone, or where the contrivance used to move the saw is not sufficient absolutely to control the motion, the result is defective; and it is by means of my friction rollers, one of which is pressed up by the springs of the swinging frame in which it is set, that I secure the perfect control of the revolution of the saw, unaffected by the revolution of the grindstone, and this, no matter what may be the thickness of the saw, as the pring friction roller adjusts itself to any of the various thicknesses of saws.

It is also one of the advantages of my machine, that the rest which sustains the saw against the face of the grindstone, is also independent of the motion of either of the grindstone or of the saw.

The same machine which I have described for grinding saws, may also be used for polishing, by simply substituting a polishing wheel for the grindstone.

Having thus described my improvement in machines for grinding and polishing saws, what I claim as my invention, and desire to secure by Letters Patent is,

The use of an adjustable friction roller, set in a swinging frame, and pressed up by springs, in combination with another friction roller, on a permanent revolving axis, for the purpose of revolving the saw, at a uniform speed, differing from that of the grindstone, independently of the motion of the stone, and unaffected by it, thus preventing the tendency of the stone to affect the revolutions of the saw.

In testimony whereof, the said CHARLES W. HUBBARD hath hereunto set his hand in presence of us.

CHARLES W. HUBBARD.

Witnesses:
MARTIN G. CUSHING,
W. BAKEWELL.